US009493927B2

(12) United States Patent
Park et al.

(10) Patent No.: US 9,493,927 B2
(45) Date of Patent: Nov. 15, 2016

(54) METHOD AND APPARATUS FOR CONTROLLING SWING BODY OF CONSTRUCTION EQUIPMENT

(71) Applicant: Doosan Infracore Co., Ltd., Incheon (KR)

(72) Inventors: Cheol Gyu Park, Seoul (KR); Seung Jin Yoo, Seoul (KR); Sung Woo Cho, Seoul (KR)

(73) Assignee: Doosan Infracore Co., Ltd., Incheon (KR)

( * ) Notice: Subject to any disclaimer, the term of this patent is extended or adjusted under 35 U.S.C. 154(b) by 0 days.

(21) Appl. No.: 14/630,161

(22) Filed: Feb. 24, 2015

(65) Prior Publication Data

US 2015/0240449 A1 Aug. 27, 2015

(30) Foreign Application Priority Data

Feb. 24, 2014 (KR) ........................ 10-2014-0021073

(51) Int. Cl.

| | |
|---|---|
| ***E02F 9/20*** | (2006.01) |
| ***E02F 9/22*** | (2006.01) |
| ***B66C 13/18*** | (2006.01) |
| ***B66C 23/84*** | (2006.01) |
| ***F16H 61/16*** | (2006.01) |
| ***F16H 61/421*** | (2010.01) |
| ***E02F 9/12*** | (2006.01) |
| ***F15B 11/04*** | (2006.01) |

(52) U.S. Cl.

CPC ............. *E02F 9/123* (2013.01); *E02F 9/2203* (2013.01); *F15B 11/04* (2013.01)

(58) Field of Classification Search

CPC ..... E02F 9/123; E02F 9/2203; E02F 9/2075; E02F 9/20; E02F 9/207; E02F 9/2242; E02F 9/226; F15B 11/04; B66C 13/18; B66C 23/84; F16H 61/16; F16H 61/421

USPC .......................... 701/50; 414/687; 180/65.21

See application file for complete search history.

(56) References Cited

U.S. PATENT DOCUMENTS

2011/0029206 A1* 2/2011 Kang ...................... E02F 9/123 701/50

2014/0277970 A1* 9/2014 Sakamoto ............... E02F 9/123 701/50

* cited by examiner

*Primary Examiner* — Nga X Nguyen

(74) *Attorney, Agent, or Firm* — John D. Veldhuis-Kroeze; Westman, Champlin & Koehler, P.A.

(57) ABSTRACT

Exemplary embodiments relate to controlling a swing body of construction equipment. Disclosed methods may include selecting a representative signal vs. speed curve, receiving an operating signal value from the operating input device, obtaining a reference speed value by applying said operating signal value to the selected curve, transmitting a command for rotational speed equivalent to said reference speed to the swing motor making the swing body rotate, obtaining rotational speed of said motor, determining whether a value obtained by subtracting rotational speed from reference speed exceeds the maximum permissible errors, obtaining a new signal vs. speed curve equivalent to rotational speed when a value obtained by subtracting rotational speed from reference speed exceeds the maximum permissible errors, obtaining a new reference speed value from an operating signal value using said new curve, and transmitting a new command for rotational speed equivalent to said new reference speed to said motor.

9 Claims, 9 Drawing Sheets

METHOD AND APPARATUS FOR CONTROLLING SWING BODY OF CONSTRUCTION EQUIPMENT

CROSS-REFERENCE TO RELATED APPLICATION

This application is based on and claims priority from Korean Patent Application No. 10-2014-0021073, filed on Feb. 24, 2014, with the Korean Intellectual Property Office, the disclosure of which is incorporated herein in its entirety by reference.

TECHNICAL FIELD

An exemplary embodiment of the present disclosure relates to a method for controlling a motor-driving swing body of construction equipment and particularly, to a method and apparatus for controlling angular velocity of the swing body.

BACKGROUND ART OF THE DISCLOSURE

A representative example of construction equipment having a swing body driven by a motor is a hybrid excavator of which swing energy is regenerated.

FIG. 1 is a block diagram illustrating an apparatus to drive a swing body using a conventional hydraulic motor.

FIG. 1 illustrates an apparatus to drive a swing body using a hydraulic swing motor, of an excavator. At step 180, an operator 110 manipulates a joystick 120. An operating signal generated in accordance with the manipulation, for example, a pilot pressure is transferred to the main control valve 130 from the joystick 120 at step 182 and thereby, letting a swing spool of the main control valve 130 move. At step 184, the main control valve 130 supplies the hydraulic swing motor 140 with oil pressure. The torque generated by the oil pressure in the hydraulic swing motor 140 is delivered to a swing reduction gear 150 at step 186. At step 188, the swing body 160 is circled by the torque that passed through the swing reduction gear 150. This swing system does not include any special composition measuring swing speed, which is a controlled variable. Thus, there is no other special countermeasure, except for the method that the operator 110 controls the speed by manipulating the joystick while looking at it with his eyes.

However, according to the method illustrated in FIG. 1, it may cause troubles that control performance of the swing body 160 depends heavily on the operator 110's personal capability. A method to drive an apparatus to drive the swing body easily without relying on the operator 110's capability is required.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

An exemplary embodiment of the present disclosure has been made in an effort to provide a method to control a swing body of construction equipment in an easy and accurate way.

A method to control a swing body of construction equipment according to the exemplary embodiment of the present disclosure may include selecting a representative signal vs. speed curve, receiving an operating signal value from the operating input device, obtaining a reference speed value by applying the operating signal value to the selected signal vs. speed curve, transmitting a command for rotational speed corresponding to said reference speed to the swing motor making the swing body rotate, determining on whether a value obtained by subtracting said rotational speed from said reference speed exceeds the maximum permissible errors previously set forth, obtaining a new signal vs. speed curve corresponding to said rotational speed when the value obtained by subtracting said rotational speed from said reference speed exceeds the maximum permissible errors previously set forth, obtaining a new reference speed value from the operating signal value by using said new signal vs. speed curve, and transmitting a new command for rotational speed corresponding to the new reference speed to the swing motor.

An apparatus for controlling a swing body of construction equipment according to the exemplary embodiment of the present disclosure may include an operating input device generating an operating signal value depending on manipulation, a controller selecting a representative signal vs. speed curve, obtaining a reference speed value by applying the operating signal value to the selected signal vs. speed curve, and transmitting a command for rotational speed corresponding to the reference speed to the swing motor making the swing body rotate, said swing motor making the swing body rotate in accordance with said command for rotational speed, and a speed sensor detecting rotational speed of said swing motor. The said controller has functions to determine on whether a value obtained by subtracting said rotational speed from said reference speed exceeds the maximum permissible errors previously set forth, to obtain a new signal vs. speed curve corresponding to said rotational speed when the value obtained by subtracting said rotational speed from said reference speed exceeds the maximum permissible errors previously set forth, to obtain a new reference speed value from an operating signal value by using said new signal vs. speed curve, and to transmit a command for new rotational speed corresponding to the new reference speed to said swing motor.

According to an exemplary embodiment of the present disclosure, a command for rotational speed reflecting change of inertia of the swing body may be generated without additional displacement sensors for an actuator. The command for rotational speed generated at the moment may be followed well by real speed and thereby, when acceleration or deceleration occurs without intervals of constant velocity, the real speed is in conformity with the operator's handling and his handling may be improved.

In addition, according to the one exemplary embodiment of the present disclosure, an operator's manipulation and actual rotational way of the swing body match each other so that it may improve his handing and prevent his mistakes.

DETAILED DESCRIPTION

Hereinafter, the above-described present disclosure will be described in more detail with reference to the accompanying drawings.

It should be noted that prior to detailed descriptions of the present disclosure, specific descriptions, which are publicly known in the related art or not related to the present disclosure directly or indirectly, will be omitted. It is intended to deliver the gist of the present disclosure more clearly without clouding the gist of the present disclosure by omitting unnecessary description.

For the same reason, some constituent elements in the attached drawings are illustrated in an exaggerating, omitting or sketchy way. Further, the size of each constituent element does not entirely reflect the actual size thereof. For the identical or corresponding constituent element in each drawing, the same reference number is given.

Hereinafter, with reference to the drawings for describing a method to control a swing body in accordance with exemplary embodiments of the present disclosure, descriptions of the present disclosure will be given.

Figure 1:
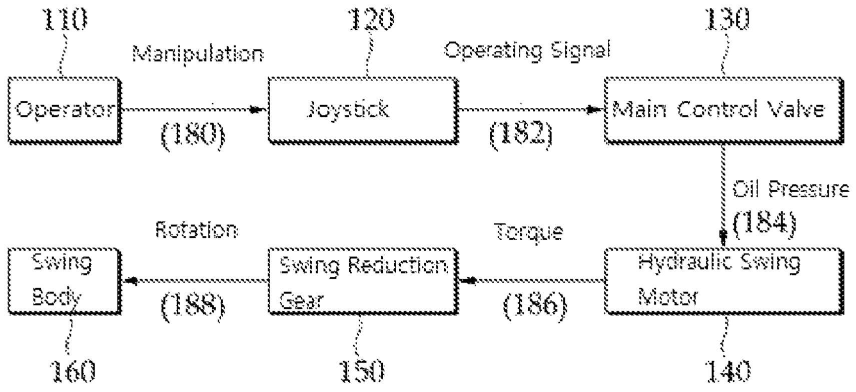
FIG. 1 is a block diagram illustrating an apparatus to drive a swing body of construction equipment, using a conventional hydraulic motor.
Figure 2:
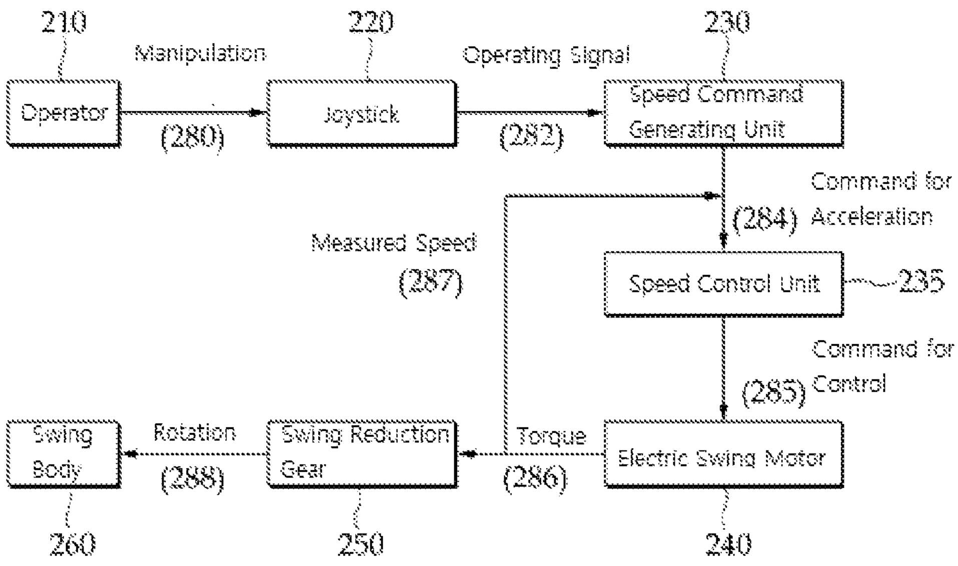
FIG. 2 is a block diagram illustrating an apparatus for controlling a swing body of construction equipment, adopting a motor in accordance with an exemplary embodiment of the present disclosure.

FIG. 2 is a block diagram illustrating an apparatus for controlling a swing body of construction equipment in accordance with an exemplary embodiment of the present disclosure.

As illustrated in FIG. 2, an operator 210 manipulates a joystick 120 at step 280. An operating signal generated by the manipulation, like a pilot pressure is delivered to a speed command generating unit 230 from the joystick 220 at step 282.

At step 284, the speed command generating unit 230 generates a command for speed or that for acceleration depending on the operating signal and then delivers it to a speed control unit 235. The command for speed or that for acceleration delivered at step 284 is a message to instruct rotation of the swing body 260 at the angular velocity equivalent to said operating signal. Hereinafter, a command for speed and a command for acceleration have the same meaning and are used together. In addition, rotational angular velocity of a swing body may be represented as speed or velocity. Hereinafter, when it is stated as 'speed or velocity' without any specific explanation, it means rotational angular velocity of a swing body. The speed control unit 235 generates a command for control in consideration of a command for acceleration by the speed command generating unit and a measured speed (or error value) at step 287 as described below and delivers the command for control to an electric swing motor 240 at step 285. A command for control is a command instructing motion of the electric swing motor 240.

The electric swing motor 240 delivers torque 286 to the swing reduction gear 250 on a basis of the command for control 285 at step 286 and delivers (feedbacks) the measured rotational speed (or error value as described hereinafter) of the electric swing motor 240 to the speed control unit 235 at step 287. A sensor measuring angular displacement and angular velocity of a motor roter for controlling speed and electric current of the electric swing motor may be installed in the electric swing motor 240. An encoder or a resolver is a representative example of those sensors.

The swing body 260 rotates by torque through the swing reduction gear 250 at step 288.

A joystick 220 is merely an example of an operating input device which an operator 210 may utilize and other types of operating input devices may be used instead of a joystick. In addition, a pilot pressure is just an example of operating signals and other types of electric or non-electric signals may be used as an operating signal.

A speed command generating unit 230 and a speed control unit 235 may be implemented as a de facto single constituent element. Both speed command generating unit 230 and speed control unit 235 are collectively called as a controller.

A swing reduction gear 250 is a constituent element supporting stable rotation of the swing body 260, but it is not necessary to exist.

Detailed motions of each component of the apparatus for controlling a swing body in FIG. 2 will be described in detail hereinafter with reference to FIGS. 3 to 9*b*.

Figure 3A:
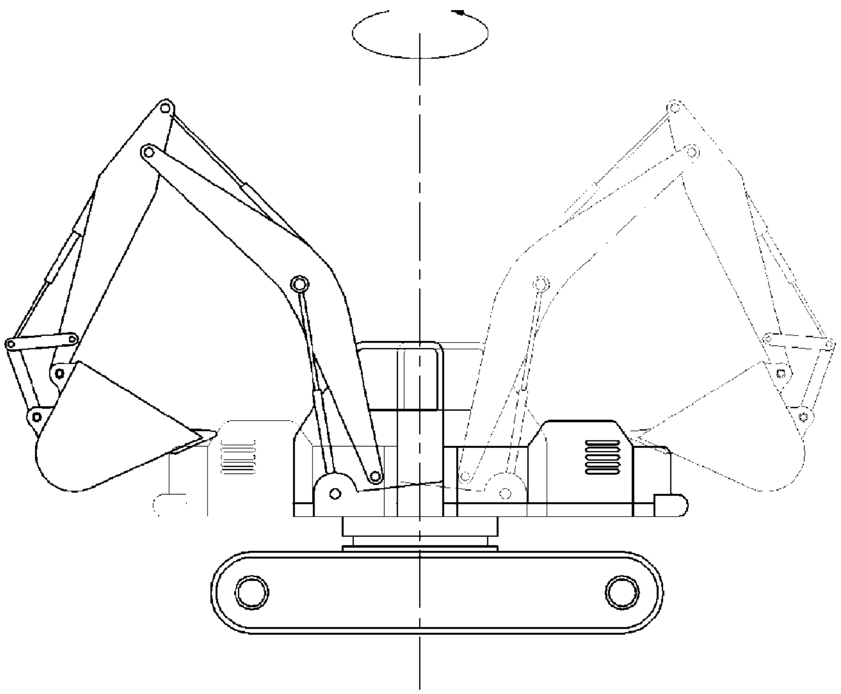
FIGS. 3*a* and 3*b* illustrate a form of motions of an excavator.
Figure 3B:
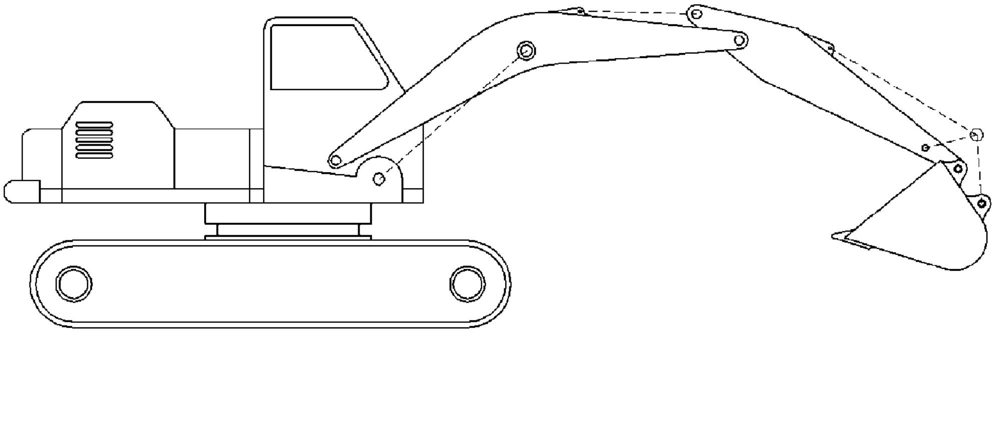

FIGS. 3*a* and 3*b* illustrate a form of motions of an excavator.

Construction equipment like an excavator usually performs its jobs including excavation or movement of earth, sand or stone with a linked structure consisting of a boom, an arm and a bucket on the upper swing body. Accordingly, a mass moment of inertia of the swing body, which is the load of a hydraulic swing motor or an electric swing motor as an actuator, greatly varies depending on the posture of the structure of a boom, an arm and a bucket or payloads in the bucket. If there is no other description hereinafter, the word 'inertia' will be used for rotational inertia. For example, when there is no payload in the bucket in the posture described in FIG. 3*a*, the inertia of the swing body is the lowest and when there are payloads in the bucket in the posture described in FIG. 3*b*, the inertia of the swing body is the highest.

Figure 4:
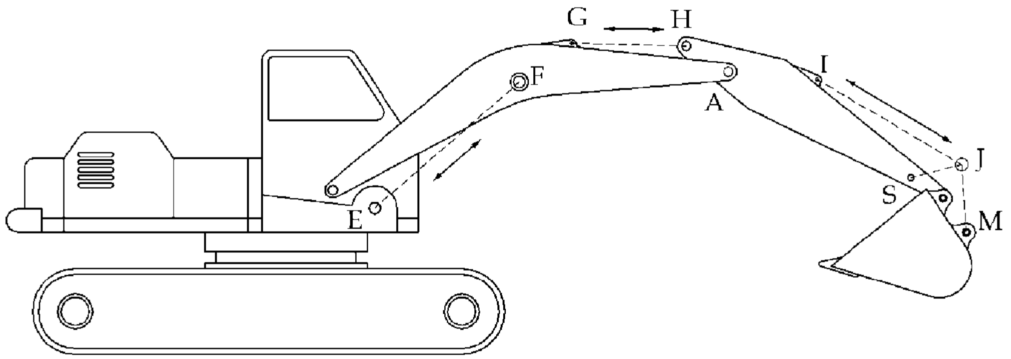
FIG. 4 illustrates an excavator using displacement sensors

FIG. 4 illustrates an excavator using displacement sensors.

Considering the mass moment of inertia of the swing body as described above, displacement sensors for recognizing the posture of the structure of boom-arm-bucket may be installed in order to generate a command for rotational speed like FIG. 4. By installing displacement sensors on the actuator (hydraulic cylinder) driving a boom, an arm and a bucket (for example, see positions of E-F, G-H and I-J in FIG. 4), the control device may calculate the inertia of the swing body and generate a proper speed command for the value obtained from the calculation. However, for using this method, many displacement sensors should be installed additionally and an issue of reliability caused by errors of these sensors may occur.

Figure 5:
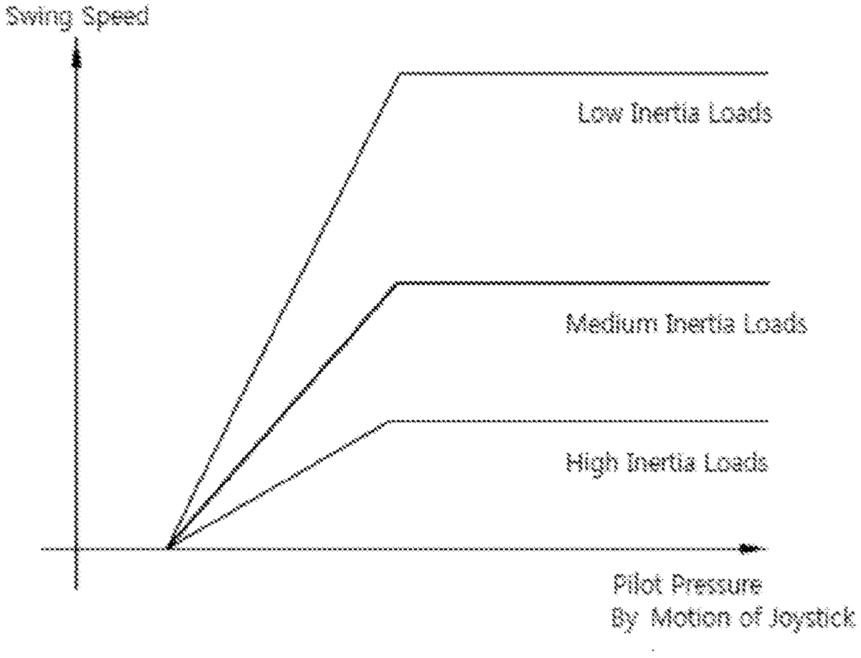
FIG. 5 illustrates a graph showing a relationship between rotational speed, which varies depending on rotational inertia load, and a signal of a joystick.

FIG. 5 illustrates a graph showing a relationship between rotational speed that varies depending on the rotational inertia load (hereinafter, the word 'inertia load' will be used together for the rotational inertia load), and a signal of a joystick. To solve the problems caused by methods illustrated in FIG. 4, a method to make a command for rotational speed regardless of change of the inertia of the swing body may be instead considered without using displacement sensors on a boom actuator, an arm actuator and a bucket actuator. An experimenter may identify a relationship between a pilot pressure generated by manipulation of a joystick and a steady state of the speed of the swing body through experiment using an excavator adopting a hydraulic swing motor. Or an experimenter may identify a relationship of a steady state of the speed of the swing body when the swing body has the lowest inertia loads through experiment using an excavator adopting an electric motor. Those curves may be created in numerous numbers depending on the change of the inertia of the swing body, but a representative curve representing those curves may be appointed.

A representative curve may be a curve under the case where the swing body has a medium-inertia load, or one under the case where the swing body has the lowest-inertia loads, or another type of curve, which is close to the case where the swing body has the lowest inertia loads. As described later, an apparatus for controlling a swing body performs jobs to change and apply a curve starting from a representative curve to a speed vs. pressure curve, which is located in a lower position depending on feedback of rotational speed, that is, a curve equivalent to higher inertia loads. Accordingly, a representative curve may be appointed as a curve under the case where the swing body has comparatively low inertia loads.

Even though a curve showing medium inertia loads or low inertia loads is selected as a representative curve, when its inertia load is determined to be lower than that of the representative curve depending on the feedback of rotational speed or the torque value of the motor, the representative curve may be changed into a upper speed vs. pressure curve, that is, a curve equivalent to lower inertia loads. In this case, more concise control is available because motor output, which is much closer than real inertia loads, is emitted.

Figure 6A:
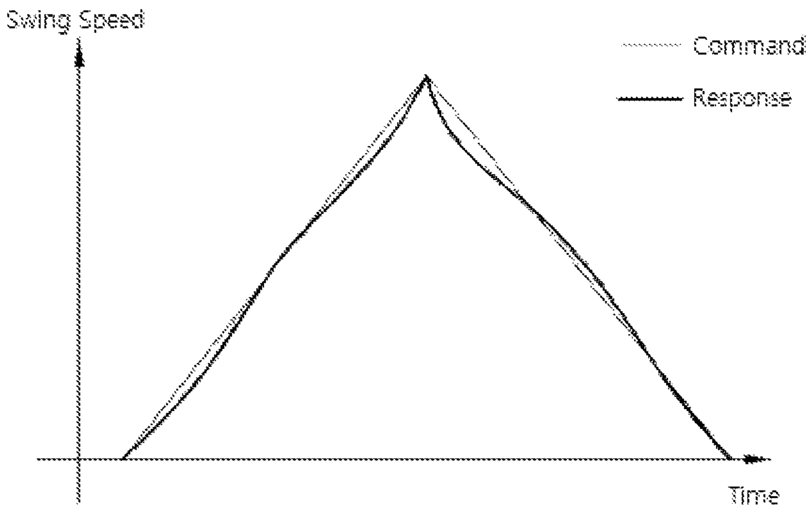
FIGS. 6*a* and 6*b* illustrate a graph showing rotation of the swing body when a command for rotational speed is made regardless of change of inertia of the swing body like FIG. 5.
Figure 6B:
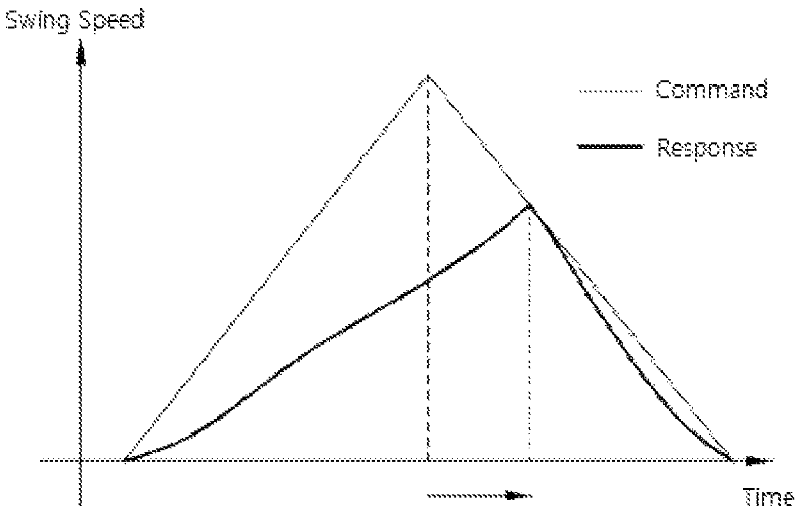

FIGS. 6*a* and 6*b* illustrate a graph showing rotation of a swing body when a command for rotational speed is made regardless of change of inertia of the swing body.

FIG. 6*a* illustrates a graph showing the case where the inertia loads of the swing body is low enough and FIG. 6*b* illustrates a graph showing the case where the inertia loads of the swing body is relatively high.

In case where the inertia loads of the swing body is low enough like FIG. 6*a*, the command input by the operator with a joystick (operating signal) and the change of the real swing (rotational) speed are almost identical.

However, when inertia loads of the swing body are high like FIG. 6*b*, the change of real rotational speed does not follow the command input by the operator with a joystick (operating signal). It means as follows: even though a user gives a command to decelerate at the time of the first dotted line, rotational speed of the swing body increases until the speed equivalent to the operating signal becomes identical to the rotational speed (i.e. timing of the second dotted line) and then the rotational speed decreases.

Figure 7A:
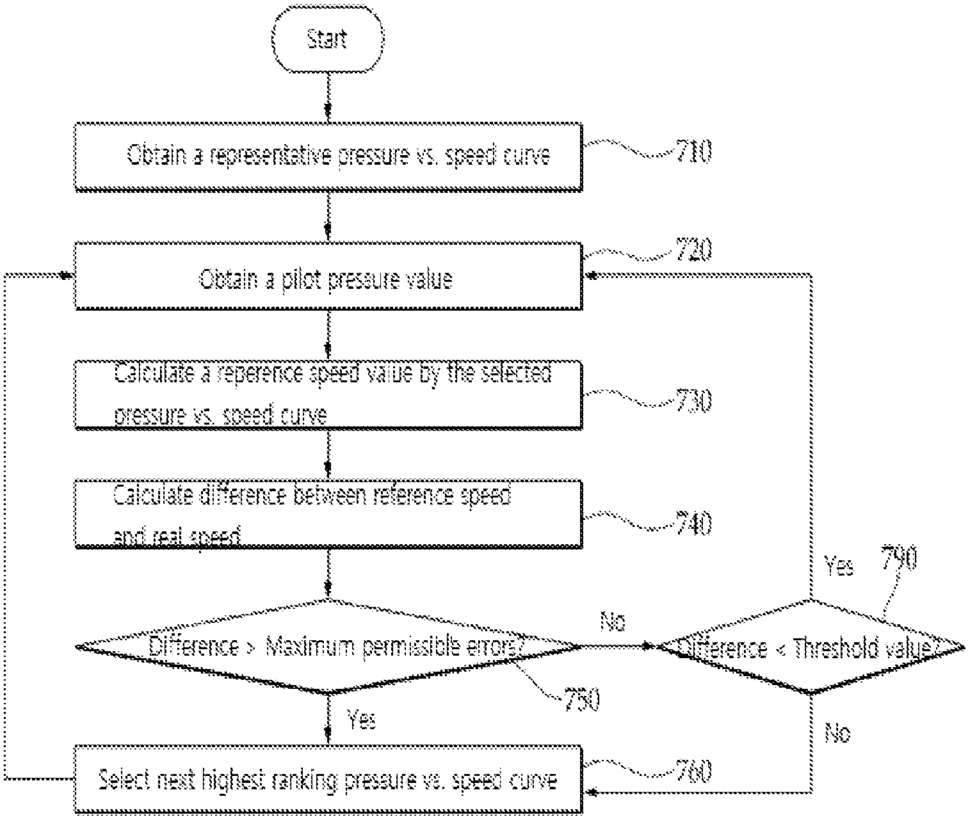
FIG. 7*a* is a flow chart illustrating the control process of the swing body of construction equipment in accordance with an exemplary embodiment of the present disclosure.

FIG. 7*a* is a flow chart illustrating a controlling process of a swing body in accordance with an exemplary embodiment of the present disclosure.

Figure 7B:
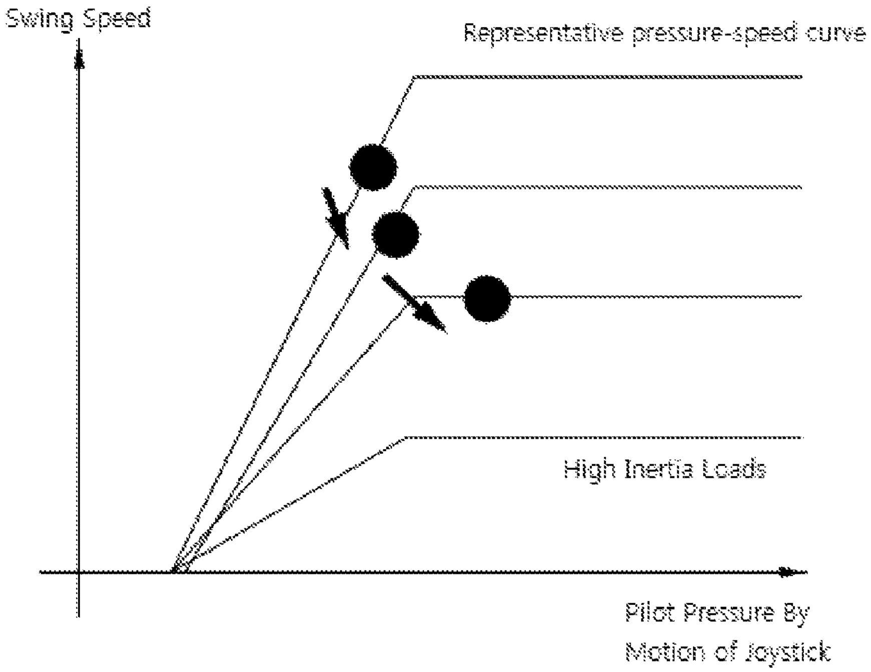
FIG. 7*b* is an example of a pressure vs. speed curve in accordance with an exemplary embodiment of the present disclosure.

FIG. 7*b* is an example of a pressure vs. speed curve in accordance with an exemplary embodiment of the present disclosure. In FIG. 7*b*, a pressure vs. speed curve is shown as an example, but the pressure may be replaced by another kind of signals. In such case, the title of the curve may be a signal vs. speed curve. A signal may include information as to the size of motion of a joystick (operating device) or that as to the size of the speed intended by the user. Such size information may be replaced by the size of pressure. An example of a pressure vs. speed curve will be described as below.

With reference to FIG. 7*a*, the controller selects a representative pressure vs. speed curve at step 710. Following cease of rotation of the swing body, when a new rotation thereof begins, the controller may newly select another representative pressure vs. speed curve.

The controller obtains a value of a pilot pressure (operating signal) of the joystick at step 720. The controller calculates a value of reference speed by applying the aforesaid value of pilot pressure to the selected pressure vs. speed curve at step 730. Currently, the representative pressure vs. speed curve is selected. But when another pressure vs. speed curve is selected depending on the motion later, the controller may calculate a value of reference speed by applying the value of pilot pressure to the newly-selected curve. Further, the controller may deliver a message which instructs to rotate at the value of reference speed to the swing motor.

At step 740, the controller calculates a value obtained by subtracting real speed of the swing body from reference speed. As described above, sensors detecting real rotational speed are installed in the swing motor of the swing body. The controller may obtain information of rotational speed from those sensors.

At step 750, the controller determines on whether a value obtained by subtracting real rotational speed from reference speed exceeds the maximum permissible errors. The maximum permissible errors may be settled by way of experiment. For example, the maximum permissible errors may be set forth as error values to the extent that a certain percentage of operators may feel awkward in manipulation. Unless a value obtained by subtracting real rotational speed from reference speed exceeds the maximum permissible errors, the process heads forward the step 790. When a value obtained by subtracting real rotational speed from reference speed exceeds the maximum permissible errors, the process heads forward the step 760.

At step 760, the controller selects the next highest-ranking pressure vs. speed curve.

As shown in FIG. 7*b*, four pressure vs. speed curves are presented. In reality, more pressure vs. speed curves may be used. A pressure vs. speed curve may be obtained by a value of virtual inertia loads. Or the pressure vs. speed curve may be stored in the controller as a form of mapping data. The next highest ranking pressure vs. speed curve means a curve, which is located in the closest distance among curves lying below the current pressure vs. speed curve, among pressure vs. speed curves which may be used by an apparatus for controlling a swing body. In other words, the next highest ranking pressure vs. speed curve means a curve having the lowest load inertia loads among curves equivalent to higher inertia loads than those of the current pressure vs. speed curve, among candidate pressure vs. speed curves, which may be used by the apparatus for controlling a swing body. According to another exemplary embodiment, when it is determined that a speed command is followed well enough and torque of motor output is sufficient, that is, when real inertia loads are lower than those of the currently selected pressure vs. speed curve, the closest curve among curves, which are located higher than the current pressure vs. speed curve may be used as the next highest ranking pressure vs. speed curve.

At step 790, the controller determines on whether a value obtained by subtracting real speed of the swing body from reference speed is less than the threshold previously set forth. The threshold at step 790 may be set forth as a value, which is smaller than the maximum permissible errors at step 750. According to a modified example, the threshold at step 790 may be set forth as the same value with the maximum permissible errors at step 750.

In the event that a value obtained by subtracting real speed of the swing body from reference speed equals to the threshold previously set forth or higher, the process heads towards the step 760, and the step 760, and the process starting from the step 720 to the step 750 are repeated. The repetition of the step 760, and the process from the step 720 to the step 750 continue until a value obtained by subtracting real speed of the swing body from reference speed is smaller than the threshold at step 790. In other words, the controller selects a curve, which is located in the lower position gradually in FIG. 7*b* until errors become small enough.

However, when a value obtained by subtracting real speed of the swing body from reference speed equals to the threshold previously set forth or higher even after having selected the curve at the lowest position, the process may head towards the step 720 regardless of the value obtained by subtracting real speed of the swing body from reference speed. When a value obtained by subtracting real speed of the swing body from reference speed is less than the threshold previously set forth, the process heads toward the step 720.

When a value obtained by subtracting real speed of the swing body from reference speed is less than the threshold previously set forth, the process heads towards the step 720.

Thereafter, the process from the step 720 to the step 750 is performed during rotation.

Figure 8A:
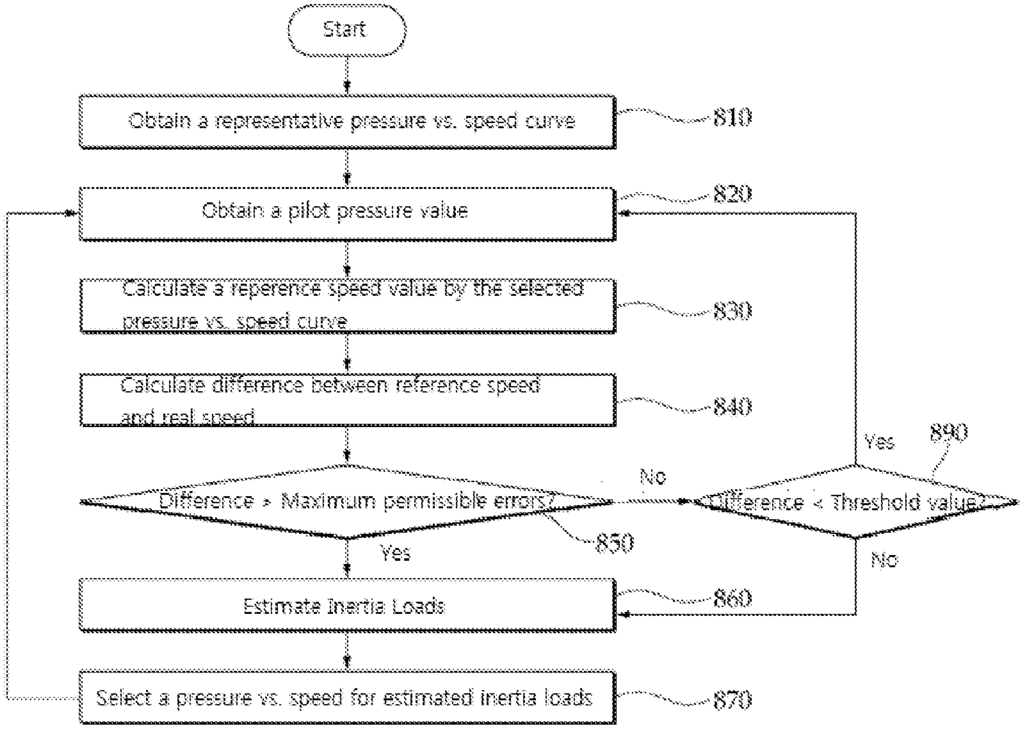
FIG. 8*a* is a flow chart illustrating the control process of the swing body of construction equipment in accordance with another exemplary embodiment of the present disclosure.

FIG. 8*a* is a flow chart illustrating a process of controlling a swing body in accordance with another exemplary embodiment of the present disclosure.

Figure 8B:
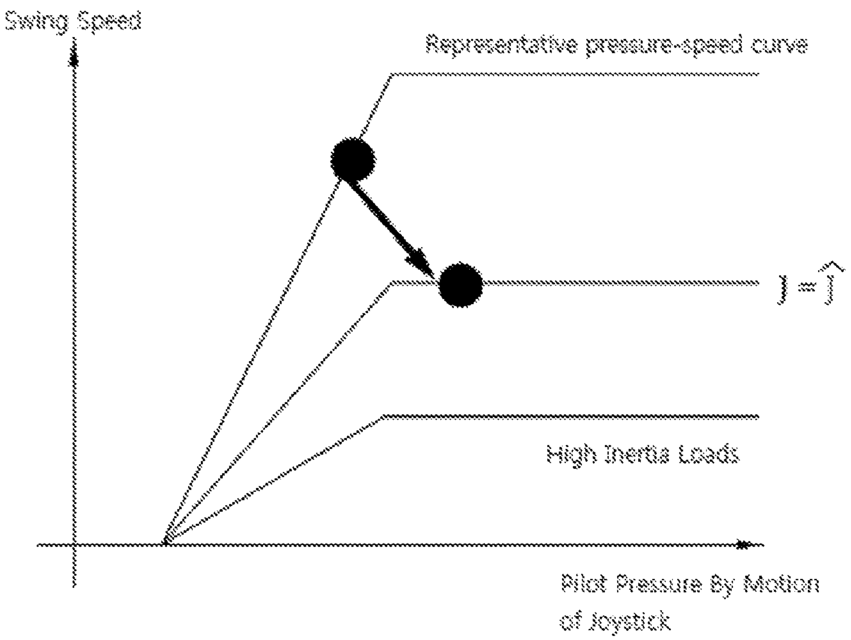
FIG. 8*b* is an example of a pressure vs. speed curve in accordance with another exemplary embodiment of the present disclosure.

FIG. 8*b* is an example of a pressure vs. speed curve in accordance with another exemplary embodiment of the present disclosure. In FIG. 8*b*, a pressure vs. speed curve is exemplified, but a pressure may be replaced by another type of signals. In this case, the title of the curve may be a signal vs. speed curve. A signal includes information as to the size of motion of a joystick (operating device) or that as to the size of speed intended by a user, and such information may be replaced by the size of pressure. A pressure vs. speed curve is exemplified as below.

The process of the steps 810, 820, 830, 840, 850 and 890 in FIG. 8*a* is identical or similar to the process of the steps 710, 720, 730, 740, 750 and 790, so that detailed description thereof is hereby omitted.

At step 860, the controller estimates a rotational inertia load.

Mathematical Formula 1. is a mathematical formula for estimating a rotational inertia load.

$$J d\omega/dt = \tau - \tau_{friction}$$ <Mathematical Formula 1>

ω is the angular speed. t is the time. τ is the torque of the swing motor and $\tau_{friction}$ is the torque loss due to friction. J is the rotational inertia load. dω/dt is the rate of change of angular speed with respect to time (the differential value of angular speed with respect to time).

The controller may read information of speed of the swing motor and of torque. The torque loss due to friction is an invariant value, so that an experimenter obtains the torque loss via experiment and may apply it in order for the controller to utilize it. The controller may estimate a rotational inertia load on a basis of the said information. For designing a load estimating unit, methods including Luenburger observer or Kalman filter may be used.

At step 870, the controller selects a pressure vs. speed curve corresponding to the estimated inertia load. Referring to FIG. 8*b*, the second curve from the top is the pressure vs. speed curve corresponding to the estimated inertia load. Accordingly, the controller may obtain the speed corresponding to the current pilot pressure by using the relevant pressure vs. speed curve at step 830 following the step 870.

When another pressure vs. speed curve exists between the original pressure vs. speed curve and a newly selected pressure vs. speed curve, the controller selects another pressure vs. speed curves located between the original pressure vs. speed curve and a newly selected pressure vs. speed curve in order at constant speed, and may transmit a command message instructing rotation at the relevant speed in order after obtaining a reference speed in accordance with the selection. In this case, rapid change of the curve may be avoided.

Figure 9A:
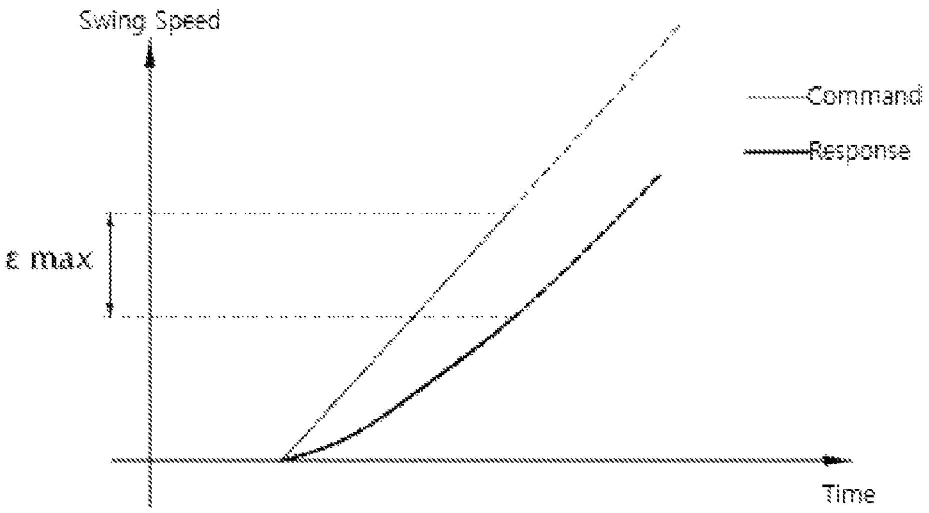
FIGS. 9*a* and 9*b* illustrate the command speed in accordance with manipulation by a joystick and the response speed (i.e. real rotational speed) when the aforesaid described exemplary embodiments are applied.
Figure 9B:
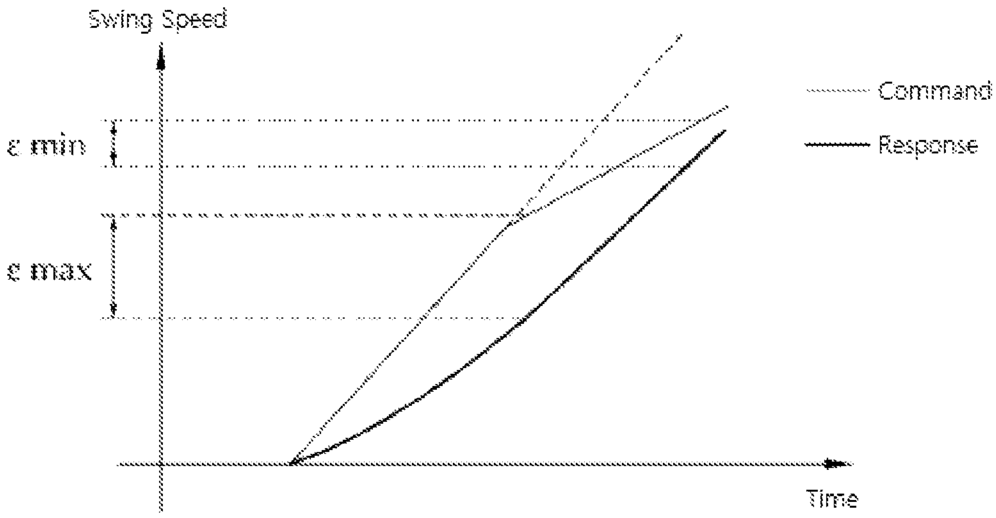

FIGS. 9*a* and 9*b* illustrate a command speed and a response speed (real rotational speed) by way of manipulation of a joystick in case of application of exemplary embodiments described above. When an inertia load of the swing body is comparatively high, difference between the command speed and the response speed (real rotational speed) may occur as shown in FIG. 9*a*. When such difference exceeds the maximum permissible errors (ϵ max), it may be reduced less than the threshold value (ϵ min) by letting a grade of the command speed be reduced (by selecting a pressure vs. speed curve located at a lower position gradually in order) as shown in FIG. 9*b*. By using this kind of a method, a user's handling may be greatly improved. After one time rotation through said process, the controller may initialize a pressure vs. speed curve as the representative pressure vs. speed curve at the next rotation or use the pressure vs. speed curve selected conclusively at the previous rotation as the initialized value. In case of simple and repetitive operation having the rotational inertia loads identical to those at the time of the previous rotation, when the latter method is used, speed control in accord with the operator's intention is available from the initial stage of rotation.

According to exemplary embodiments as described above, a command of rotational speed reflecting change of the inertia load of the swing body may be generated without additional displacement sensors installed in actuators. The rotational speed message generated at that time may be followed well by real speed and thereby, when acceleration or deceleration occurs without intervals of constant speed, real speed corresponds to manipulation by the operator and it may lead to improvement of handling by the operator.

In addition, when rotational speed errors are great, the swing motor continues to output the highest torque. However, when this method is applied, the size of speed errors may be limited and thus, hours for generating the highest torque may be reduced. In this case, voluntary operation of a shape of the torque of the motor is available, so it may result in improving the operator's handling or reducing motor heating. Thus, reliability of the motor may be improved through prevention of thermal demagnetization of the roter.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on ort the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "unit" according to the exemplary embodiments of the present disclosure, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to be executed on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, the components and units may be implemented such that they execute one or more CPUs in a device or a secure multimedia card.

A person skilled in the art may understand that the present disclosure may be implemented as other specific exemplary embodiments without departing from the technical spirit and essential characteristics of the present disclosure. Accordingly, it should be understood that the aforementioned exemplary embodiments are illustrative but not restrictive in terms of all aspects. The scope of the present disclosure which will be described later, rather than the above description represented in the claims by, the meaning and cope of the appended claims and their equivalents derived from the concept that all changes or variants which are included within the scope of the present disclosure should be interpreted.

On the other hand, a preferred embodiment of the present disclosure is shown in the present specification and drawings. Although specific terms are used, but they are used to explain easily the technical contents of the present disclosure and to assist the understanding of the present disclosure in a general sense, not to limit the scope of the present disclosure. In addition to the embodiments disclosed herein, another modified exemplary embodiments based on the technical idea of the present disclosure may be implemented. It is apparent to those of ordinary skill in the art to which this disclosure pertains.

What is claimed is:

1. A method for controlling a swing body of construction equipment, comprising:

selecting a pressure vs. speed curve;

receiving an operating signal value from an operating input device;

obtaining a reference speed value by applying said operating signal value to the selected pressure vs. speed curve;

transmitting a command for a rotational speed equivalent to said reference speed to the swing motor making the swing body rotate, obtaining a rotational speed of said swing motor;

determining on whether a value obtained by subtracting said rotational speed from said reference speed exceeds maximum permissible errors previously set forth;

obtaining a new pressure vs. speed curve corresponding to said rotational speed, when a value obtained by subtracting said rotational speed from said reference speed exceeds the maximum permissible errors previously set forth;

obtaining a new reference speed value from a new operating signal value by using said new pressure vs. speed curve; and transmitting a new command for a rotational speed equivalent to said new reference speed to said swing motor, wherein the step of obtaining the new pressure vs. speed curve corresponding to said rotational speed comprises:

selecting a pressure vs. speed curve corresponding to the lowest rotational inertia among pressure vs. speed curves corresponding to higher rotational inertia than the currently selected pressure vs. speed curve, among candidate pressure vs. speed curves previously set forth; and repeating said step of selecting a pressure vs. speed curve corresponding to the lowest rotational inertia among the pressure vs. speed curves until a value obtained by subtracting said rotational speed of said swing motor from the reference speed obtained by using the currently selected pressure vs. speed curve is less than a threshold previously set forth.

2. The method for controlling a swing body of construction equipment of claim 1, wherein the step of obtaining a new pressure vs. speed curve corresponding to said rotational speed comprises:

selecting a pressure vs. speed curve corresponding to the highest rotational inertia among pressure vs. speed curves corresponding to lower rotational inertia than the currently selected pressure vs. speed curve, among candidate pressure vs. speed curves previously set forth; and repeating said step of selecting a pressure vs. speed curve corresponding to the highest rotational inertia until a value obtained by subtracting the reference speed obtained by using the currently selected pressure vs. speed curve from said rotational speed of the swing motor is less than the threshold previously set forth.

3. The method for controlling a swing body of construction equipment of claim 1, wherein said threshold value previously set forth is lower than said maximum permissible errors.

4. The method for controlling a swing body of construction equipment of claim 1, further comprising, storing a final pressure vs. speed curve in the immediate previous rotational motion and using it as an initial value of a pressure vs. speed curve of the next rotational motion.

5. The method for controlling a swing body of construction equipment of claim 1, wherein the step of obtaining a new pressure vs. speed curve corresponding to said rotational speed comprises:

estimating a rotational inertia load of said swing body by using said rotational speed; and obtaining a new pressure vs. speed curve corresponding to said estimated rotational inertia load.

6. An apparatus for controlling a swing body of construction equipment, comprising:

an operating input device configured to generate an operating signal value depending on a manipulation;

a controller configured to:

select pressure vs. speed curve;

obtain a reference speed value by applying said operating signal value to the selected pressure vs. speed curve and transmitting a command for a rotational speed equivalent to said reference speed to the swing motor making the swing body rotate;

said swing motor configured to make the swing body rotate in accordance with said command for rotational speed; and a speed sensor configured to detect a rotational speed of said swing motor, wherein said controller is further configured to:

determine on whether a value obtained by subtracting said rotational speed from said reference speed exceeds maximum permissible errors previously set forth;

obtain a new pressure vs. speed curve corresponding to said rotational speed, when a value obtained by subtracting said rotational speed from said reference speed exceeds the maximum permissible errors previously set forth;

obtain a new reference speed value from an operating signal value by using said new pressure vs. speed curve;

transmit a new command for a rotational speed equivalent to said new reference speed to said swing motor;

select a pressure vs. speed curve corresponding to the lowest rotational inertia among pressure vs. speed curves corresponding to higher rotational inertia than the currently selected pressure vs. speed curve, among candidate pressure vs. speed curves previously set forth; and repeat the selection of a pressure vs. speed curve corresponding to the lowest rotational inertia by the controller until a value obtained by subtracting said rotational speed of the swing motor from the reference speed obtained by using the currently selected pressure vs. speed curve is less than a threshold previously set forth.

7. The apparatus for controlling a swing body of construction equipment of claim 6, wherein said controller is further configured to select and repeat the selection of a pressure vs. speed curve corresponding to the highest rotational inertia among pressure vs. speed curves corresponding to lower rotational inertia than the currently selected pressure vs. speed curve, among said candidate pressure vs. speed curves previously set forth until a value obtained by subtracting the reference speed obtained by using the currently selected pressure vs. speed curve from said rotational speed of the swing motor is less than the threshold previously set forth.

8. The apparatus for controlling a swing body of construction equipment of claim 6, wherein said threshold previously set forth is lower than said maximum permissible errors.

9. The apparatus for controlling a swing body of construction equipment of claim 6, wherein said controller is further configured to estimate a rotational inertia load of said swing body and obtain a new pressure vs. speed curve corresponding to the estimated rotational inertia load.

* * * * *